Figure 12:
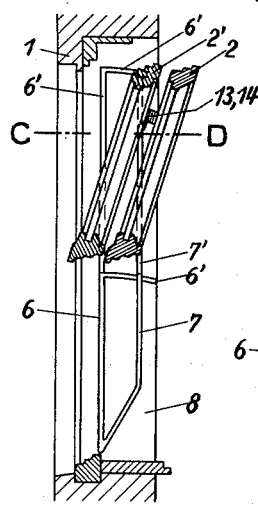
Figure 13:
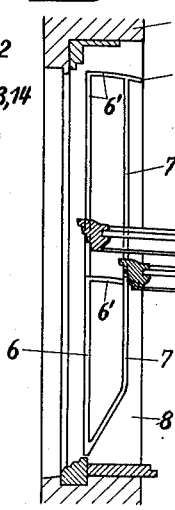
Figure 14:
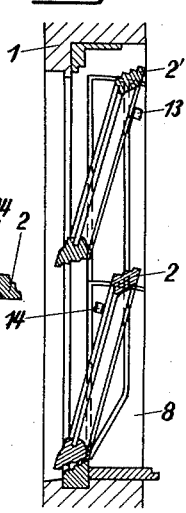

Jan. 21, 1941.  E. KIRCHNER  2,229,026
SASH WINDOW
Filed July 23, 1937  3 Sheets-Sheet 1
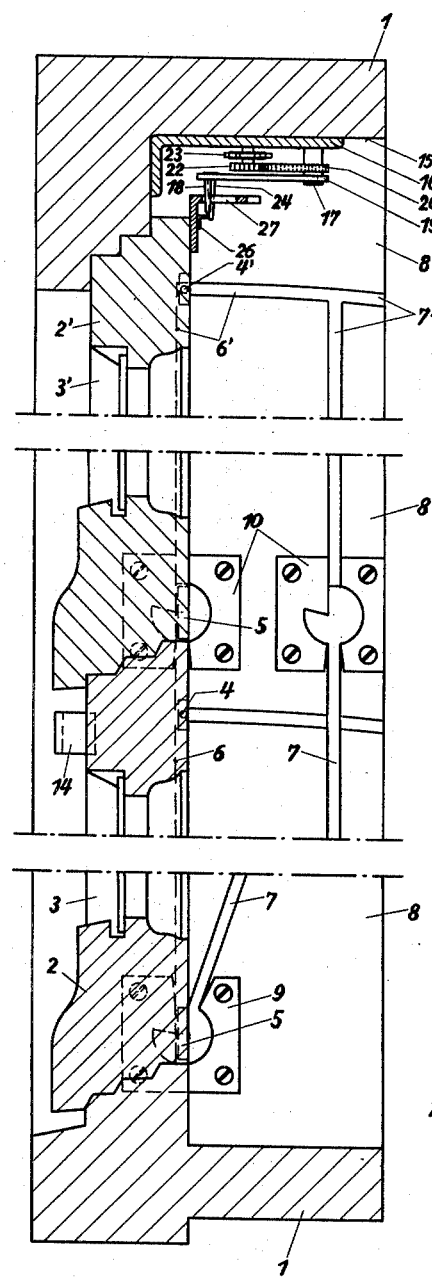
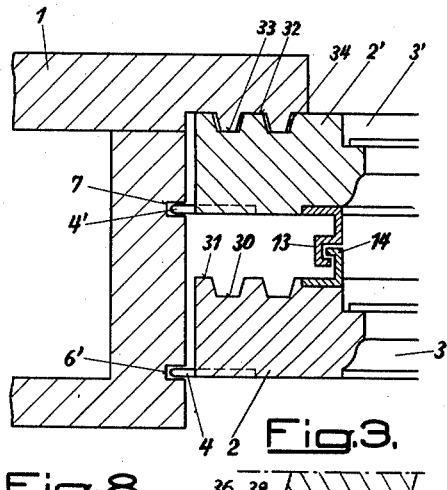
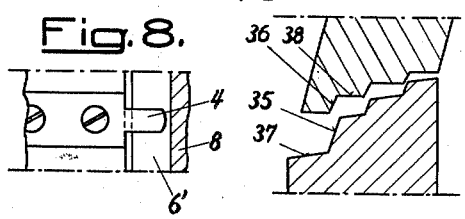
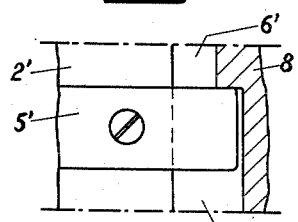 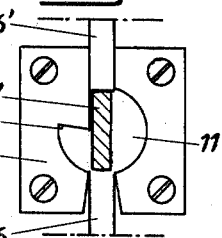
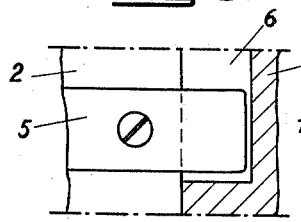 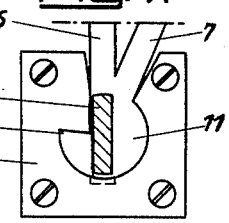
Inventor:
Emil Kirchner.

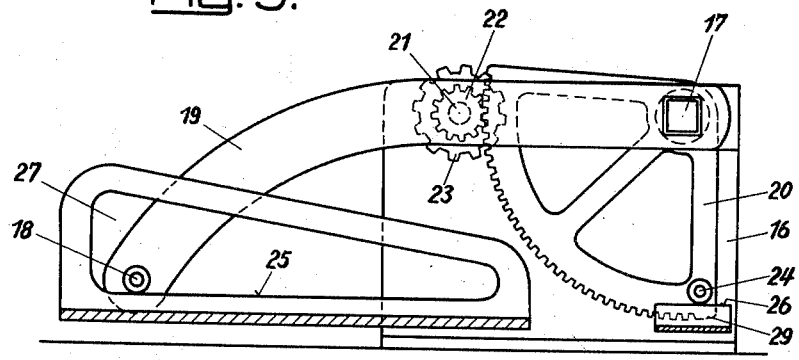
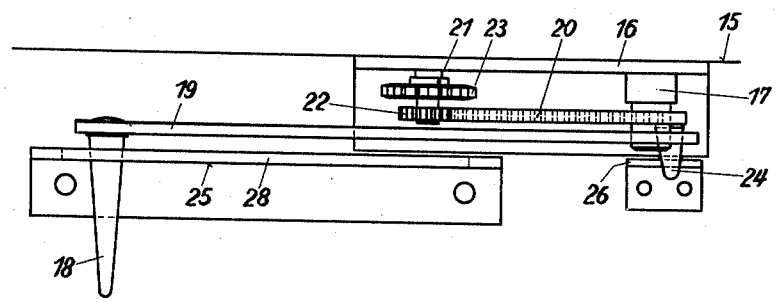
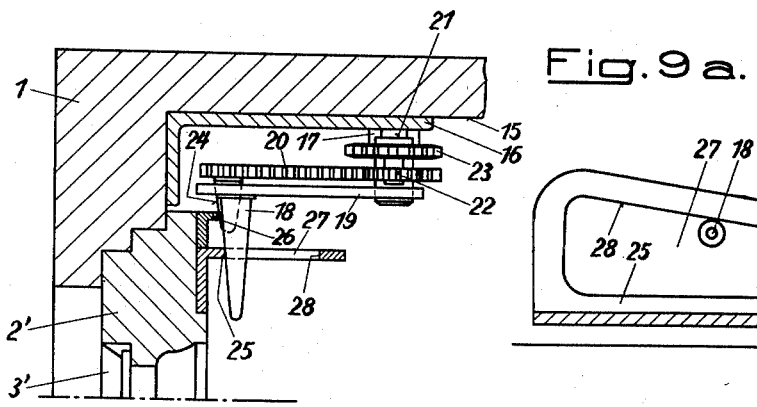

Jan. 21, 1941.　　　　E. KIRCHNER　　　2,229,026
SASH WINDOW
Filed July 23, 1937　　　3 Sheets-Sheet 3

Inventor:
Emil Kirchner.

Patented Jan. 21, 1941

2,229,026

UNITED STATES PATENT OFFICE 2,229,026

SASH WINDOW

Emil Kirchner, Grossenhain, Saxony, Germany

Application July 23, 1937, Serial No. 155,279
In Germany October 10, 1930

6 Claims. (Cl. 20—42)

This invention relates to a sash window possessing a plurality of vertically movable sashes which slide in grooves and the lower ones of which can be swung into a rear guide and pushed up to open the window.

One of the objects of the invention is to provide for easy ventilation by means of a closure arranged at the upper jamb, which permits automatic coupling of upwardly moved sashes and simultaneous opening of the same. During raising of the sashes coupling members automatically become engaged with one another so as to produce a sliding clutch which requires no special handling and may be of any suitable type, provided the sashes are in sliding connection and are kept approximately at the same distance from one another. The closure operator shown comprises a toothed segment at the upper jamb, which can be moved by means of a chain, etc., and which, by means of a downwardly projecting conical pin, during the raising of a sash, enters a slot of a pressure bar secured to the sash to press the latter in closing position against the window frame while permitting inward tilting thereof.

Another feature of the invention is to insure complete protection against the elements. For this purpose the sides of the sashes and of the window frame possess racklike grooves and tongues which are easy to produce and provide for frictionless movement of the sashes as well as airtight closing, since the labyrinth-like form of the seal brakes the speed of inflowing wind. Owing to the air spaces present in the seals the sashes cannot swell up and stick.

The upper and lower portions of the sash framings and of the window frame possess an outwardly sloping saw blade rabbet which absolutely excludes air and water. Unlike the known types of sash windows which particularly at the lower frame portions need much play to prevent swelling by rain water, the window according to the invention is provided with closely superposed rabbets of saw blade shape arranged and inclined in such manner that the tooth faces form obtuse angles. Owing to this conical form of the toothings a sash on being pulled down presses with increasing firmness against the correspondingly formed counter rabbet. When the wood in the lower portions of a window swells up in wet weather, air spaces will form also at the horizontally sloping faces of the new device, but they will not interfere with the exclusion of water and air, as the vertically sloping walls of the rabbet will press still more tightly against the window frame.

Figure 15:
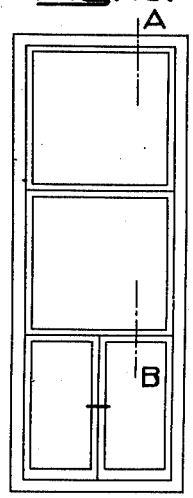
Figure 16:
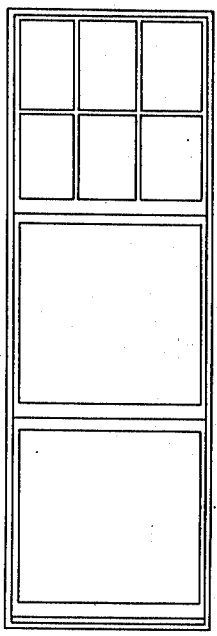
Figure 17:
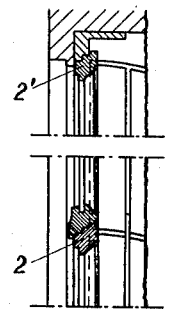
Figure 18:
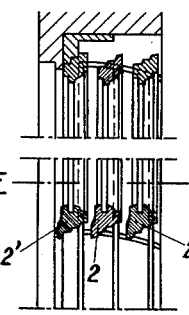
Figure 19:
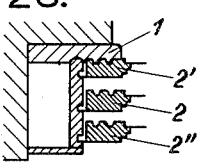
Figure 20:
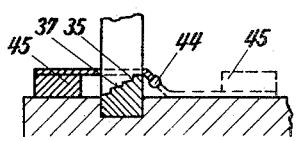
Figure 21:
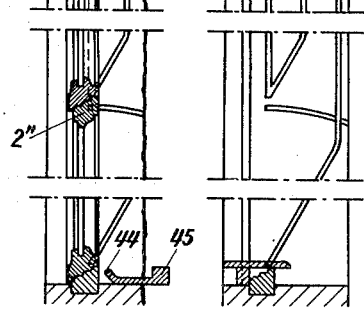

By way of example, several embodiments of the invention are illustrated in the accompanying drawings, in which Figure 1 is a longitudinal section of a sash window on the line A—B, of Fig. 15; Fig. 2, a cross section thereof on the line C—D, of Fig. 12; Fig. 3, a sectional view of the lower portion of a lower sash when open; Figs. 4 and 5 are detail views of the guide iron and plate of an upper sash; Figs. 6 and 7 are detail views of the guide iron and plate of a lower sash; Fig. 8 is a detail view of the top guide pin; Fig. 9, a bottom view of the closure operator in closed position; Fig. 9a, a view thereof in open position; Fig. 10, an elevation thereof; Fig. 11, a side view thereof; Figs. 12 to 15 are diagrammatic views of windows having two sashes in different positions; Figs. 16 to 18 is a diagrammatic view of a window having three vertically displaceable sashes and serving as a door; Fig. 19 shows the coupling for the raised lower sash; Fig. 20 is a section on the line E—F, of Fig. 18; and Fig. 21, a detail view of a reversible door sill.

Referring to the drawings, in the window frame 1 the framings 2, 2' of the sashes 3, 3' are arranged and provided with guide pins 4, 4' secured to the upper side members of the framings 2, 2', as indicated in Figs. 1 and 8. The lower portions of the members 2, 2' possess guide irons 5, 5' which together with the pins 4, 4' slide in longitudinal grooves 6, 7. At the point of intersection of the inner groove 6 and outer groove 7 the guide plates 9 are attached to the lateral frame members 8 to permit complete or partial inward tilting of the lower sash, whilst the guide plates 10 disposed on a level with the guide irons of the top sash make possible inward tilting of the latter either alone or together with the raised lower sash.

The guide plates possess circular recesses 11 which serve as pivot bearings for the guide members 5, 5' during motion of the sashes, the noses 12 preventing motion of the sashes beyond the horizontal line. Into the upper guide plates 10 open the guide grooves 6 and 7 which in upward direction are made shallower, so that the continuations 6', 7' can accommodate the upper short guide pins 4, 4' but not the longer guide irons 5, 5' and the lower sash when raised is thus automatically kept in tilted position.

The inside of the top sash and the outside of the lower sash are provided with the coupling members 13, 14 by means of which the raised lower sash forms a sliding connection with the top sash, the coupling members coming into engagement with one another when the lower sash is opened and thereby displaced upwardly.

The upper member or jamb 15 of the frame 1 is fitted with a holding plate 16 having a pin 17 about which a swinging lever 19 possessing a conical pin 18 can be rotated. The pin 17 has a keyed-on toothed segment 20 which is in mesh with a pinion 22 carried by a pin 21 which supports also a sprocket wheel 23 shown in Fig. 10, which by means of a chain, not shown, and of a sprocket not shown laterally arranged on the frame 1 can be operated from below. The toothed segment 20 possesses a second conical pin 24 merely serves for pressing the closed window against the frame whilst the longer pin 18, besides performing the same function, prevents also the inwardly tilted window from tilting down completely. The pin 18 is normally of such length that its point still abuts against the ledge 28 when the toothed segment 20 has reached its last tooth. The inwardly moved window is therefore in this last position secured by the last tooth of the segment 20 acting as stop and, further, by the point of the pin 18 which is still located in the slot 27, as indicated in Fig. 9a.

To open the top sash the pinion 22 and the toothed segment 20 are turned by means of the operating chain and thereby also the swinging lever 19 with the conical pin 18 which moves in the slot 27 of the pressure bar 25. The top sash tilts inwardly and is guided by the ledge 28 of the bar 25 until the last tooth of the segment 20, which acts as stop 29, prevents further motion. This position of the pin 18 is indicated in Fig. 9a. For better ventilation the sash can be turned still more, as the last tooth of the segment 20 acting as stop 29 is so constructed that uncoupling can be effected by tilting the window out of the position shown in Fig. 9a and down into the position shown in Fig. 13, in which case also the front end of the longer pin 18 will pass through the slot 27 of the ledge 28.

The side members of the framings 2, 2' are provided for sealing purposes with racklike tongue and groove joints 30, 31 which engage corresponding joints 32, 33 of the frame 1 to produce an airtight and waterproof connection. Between the joints air spaces 34 are provided to prevent swelling and sticking of the sashes.

The lower and upper members of the sashes possess conical rabbets resembling saw blades the walls 35, 36 and 37, 38 of which extend in an obtuse angle relative to one another. This construction obviates the necessity of providing much play for the rabbets and insures a perfectly airtight and waterproof seal, as shown in Figs. 1 and 3.

In the construction according to Figs. 15 to 18 three movable sashes are employed and, as shown in Fig. 19, the raised lowermost sash 2" is connected by a coupling with the middle sash 2'. The latter is provided with a plate 40 engaged by a spring nose 41 which can be released after the lower and middle sashes are pulled down by means of the rod 42. The two coupled sashes are preferably pulled down by means of a handle 43 disposed on the lower sash and connected with the rod 42. As windows with three sashes are chiefly used as doors, a sill 45 movable about a shaft 44 is provided to protect the gaps 35, 37 of the lower member of the frame 1. The gaps can be covered by a correspondingly formed section iron hinged to the lower portion of the frame 1 or to the floor.

I claim:

1. A sash window, comprising a plurality of vertically and inwardly movable sashes, a window frame, an upper jamb and lateral members connecting therewith, guide grooves in said lateral members, guide pins forming part of the sashes for guiding them in said grooves, coupling members on the sashes, said coupling members being so constructed as to form a sliding clutch when the sashes are raised, and a closure operator for simultaneously opening the raised and coupled sashes.

2. A sash window according to claim 1, wherein the closure operator comprises a manually operable swingable toothed segment at the upper jamb, a swingable lever arranged on the segment, a conical pin on said swingable lever, a guide on the sash for said pin, said guide comprising a slot formed by a pressure bar and a guide ledge, said pin extending downwardly in such manner that during raising of a sash it enters the said slot and presses the pressure bar with the sash in closing position against the window frame and during inward motion of the sash slides along the guide ledge and tilts the sash inwardly.

3. A sash window according to claim 1, wherein the closure operator comprises a manually operable swingable toothed segment at the upper jamb, a swingable lever arranged on the segment, a conical pin on said swingable lever, a guide on the sash for said pin, said guide comprising a slot formed by a pressure bar and a guide ledge, said pin extending downwardly in such manner that during raising of a sash it enters the slot and presses the pressure bar with the sash in closing position against the window frame and during inward motion of the sash slides along the guide ledge and tilts the sash inwardly, and a second short conical pin on the toothed segment for pressing in closing position against a second pressure bar on the sash.

4. A sash window according to claim 1, wherein the coupling members are arranged on the inside of the upper sash and on the outside of the lower sash.

5. A sash window according to claim 1, wherein the coupling members are arranged on the inside of the upper sash and on the outside of the lower sash and comprise angular-irons.

6. A sash window, comprising a plurality of vertically and inwardly movable sashes, a window frame, an upper jamb and lateral members connecting therewith, long guide members on the lower side members of the sashes, short guide pins on the upper side members of the sashes, guide plates in the lower portion of the window frame and also approximately in the center thereof, said guide plates being circularly recessed and possessing noses serving as a pivot bearing for the guide members of the sashes, deep guide grooves connecting the circular recesses of the guide plates, shallow parallel guide grooves opening into the circular recesses of the guide plates arranged approximately in the center of the window frame, said shallow grooves serving only for guiding the short guide pins and preventing the entrance of the long guide members.

EMIL KIRCHNER.